US009851516B2

(12) United States Patent
Peh et al.

(10) Patent No.: US 9,851,516 B2
(45) Date of Patent: Dec. 26, 2017

(54) OPTICAL COMPONENTS ASSEMBLY

(71) Applicant: Avago Technologies General IP (Singapore) Pte. Ltd., Singapore (SG)

(72) Inventors: Chee Siong Peh, Singapore (SG); Chiew Hai Ng, Singapore (SG); David Graham McIntyre, Bellingham, WA (US); Tom White, Macungie, PA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 25 days.

(21) Appl. No.: 14/926,250

(22) Filed: Oct. 29, 2015

(65) Prior Publication Data
US 2017/0123169 A1 May 4, 2017

(51) Int. Cl.
*G02B 6/42* (2006.01)

(52) U.S. Cl.
CPC ......... *G02B 6/4231* (2013.01); *G02B 6/4204* (2013.01); *G02B 6/4207* (2013.01); *G02B 6/428* (2013.01); *G02B 6/4212* (2013.01)

(58) Field of Classification Search
CPC ............... G02B 6/4204; G02B 6/4212; G02B 6/4228–6/4231
See application file for complete search history.

(56) References Cited

U.S. PATENT DOCUMENTS

| 4,241,978 | A | 12/1980 | Dubois et al. |
| 4,995,695 | A | 2/1991 | Pimpinella et al. |
| 7,179,680 | B2 * | 2/2007 | Fries .................... G02B 6/4204 257/13 |
| 7,441,963 | B2 | 10/2008 | Dunn et al. |
| 2004/0008952 | A1 * | 1/2004 | Kragl ....................... C25D 1/00 385/88 |

* cited by examiner

*Primary Examiner* — Jerry Rahll
(74) *Attorney, Agent, or Firm* — Sheridan Ross P.C.

(57) ABSTRACT

A system, optical assembly, and optical communication system are disclosed. The optical assembly is disclosed as including an optoelectronic component having a predetermined shape and an optical module that permits light emitted by the optoelectronic component or travelling to the optoelectronic component to pass therethough. The optical module is further disclosed as including a first surface and an opposing second surface, the first surface of the optical module including a first mating feature to receive the optoelectronic component, and the second surface of the optical module including a receptacle to receive and align an optical fiber with the optoelectronic component.

20 Claims, 7 Drawing Sheets

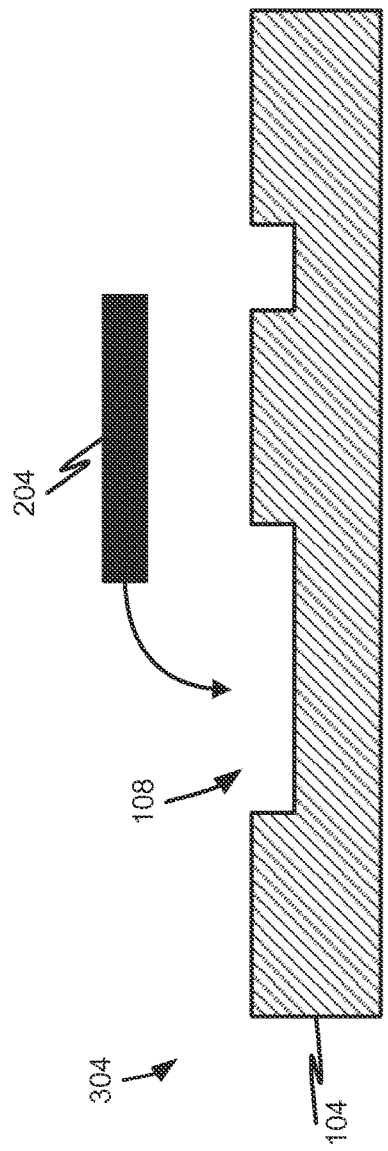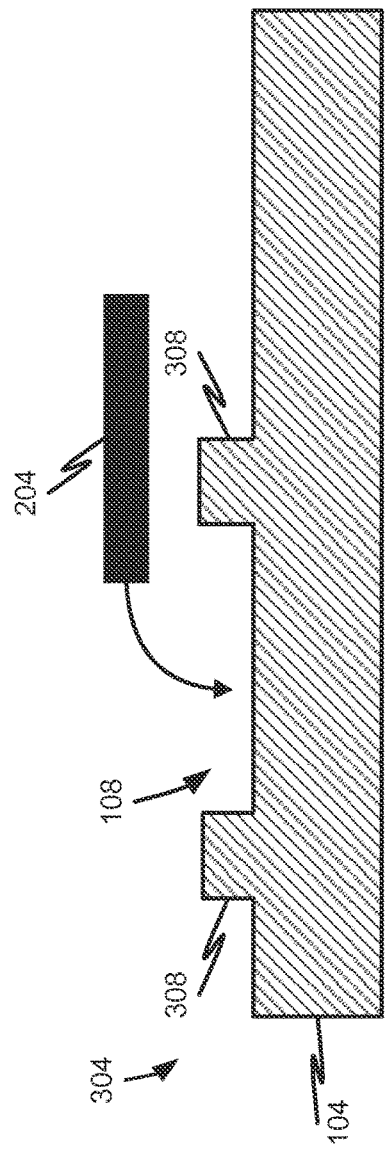

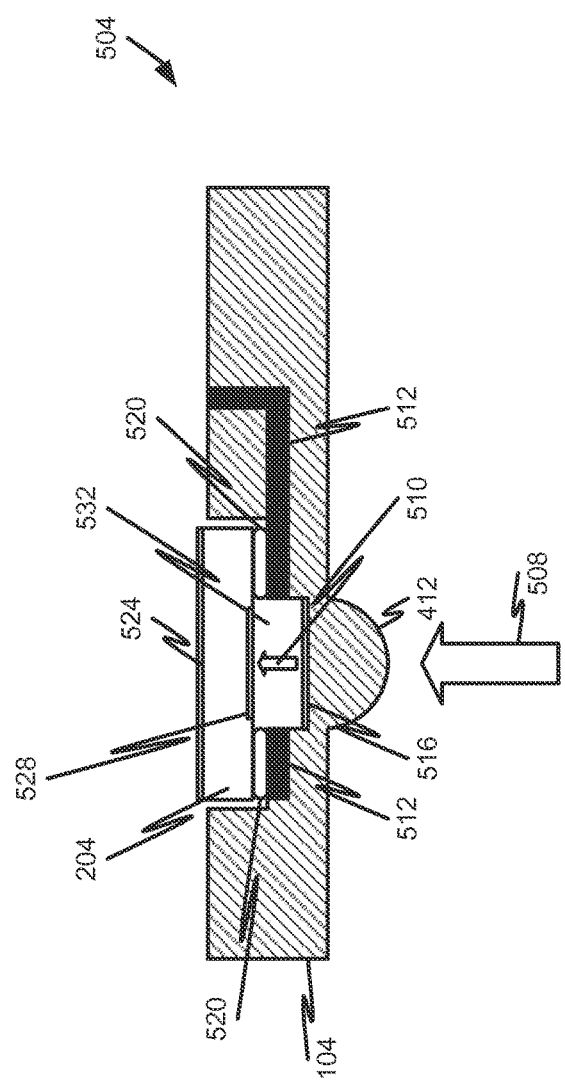

US 9,851,516 B2

OPTICAL COMPONENTS ASSEMBLY

FIELD OF THE DISCLOSURE

The present disclosure is generally directed toward optoelectronic systems and, in particular, aligning components of an optical system.

BACKGROUND

Alignment of optical components, especially in optical communication systems, is always of primary concern. If components of the optical communication system are not properly aligned, then the entire communication system may not function as desired. Furthermore, with the desire to produce optical components and assemblies at reduced costs, the possibility of using assembly machines with improper placement tolerance will increase.

BRIEF DESCRIPTION OF THE DRAWINGS

The present disclosure is described in conjunction with the appended figures, which are not necessarily drawn to scale:

FIG. 3A is a block diagram depicting an optical assembly with a cavity as a mating feature in accordance with at least some embodiments of the present disclosure;

FIG. 3B is a block diagram depicting an optical assembly with protrusions forming a mating feature in accordance with at least some embodiments of the present disclosure;

FIG. 5 is a block diagram depicting a further optical assembly in accordance with at least some embodiments of the present disclosure;

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It is one aspect of the present disclosure to provide an optical component assembly that overcomes the above-noted shortcomings. In particular, embodiments of the present disclosure will be described in connection with a self-alignment method for use with aligning optoelectronic components on an optical module whose design can be adapted for the process to produce an optical assembly or subassembly. The optical module can be made of any transparent material(s) to light having a wavelength of interest with various refractive indices for light coupling. Optoelectronic components can include (but are not limited) Light Emitting Diodes (LEDs), PN diodes, PIN Diodes (PINs), as well as vertical-cavity surface-emitting laser (VCSELs). In other words, the optical assembly may be configured for the transmission of light and/or reception of light without departing from the scope of the present disclosure.

The optical module, in some embodiments, exhibits a built-in recess (or protrusion) feature for optical components to be placed in. The recess/guides design can be customized to the optical component, so that the position of the optical component(s) relative to the optical module is adjustable by changing the shape or size or both shape and size of the optical component—This facilitates the fast, automatic alignment of optical components compared to traditional methods of optical alignment where the optical component may need to go through iterative active alignments which result in a significantly longer cycle time. In addition to the self-alignment capability, different features can be designed into the optical module to locate, register, position or improve on the coupling efficiency of the optoelectronic components.

Figure 2:
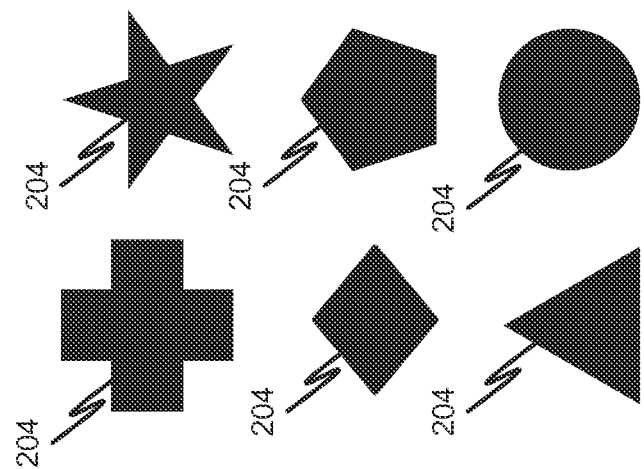
FIG. 2 is a block diagram depicting optoelectronic components in accordance with at least some embodiments of the present disclosure.
Figure 1:
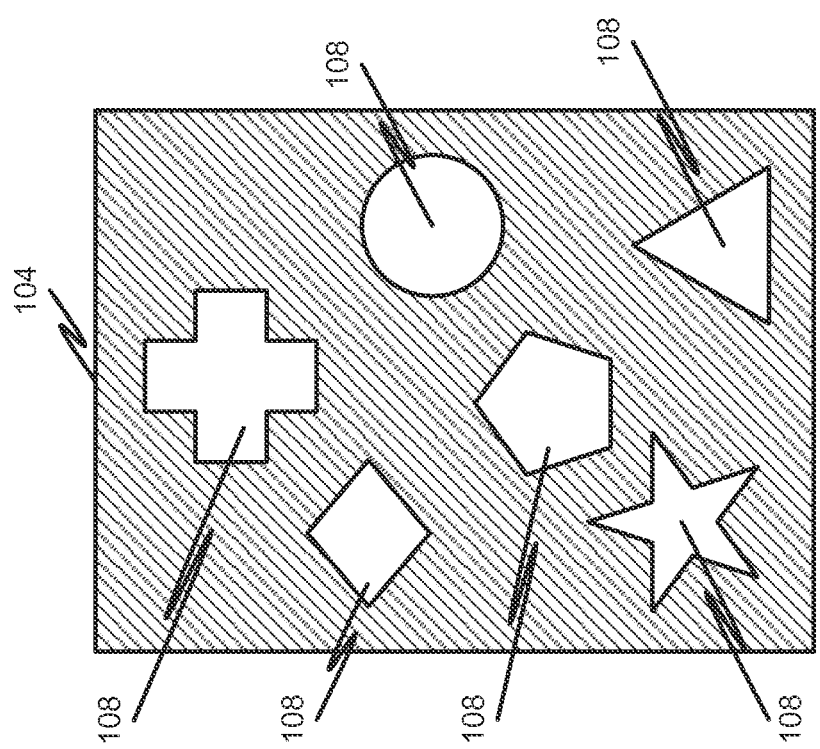
FIG. 1 is a block diagram depicting an optical module in accordance with at least some embodiments of the present disclosure.

With reference now to FIGS. 1-8 various optical assemblies, sub-assemblies, systems, and components for use in optical systems will be described in accordance with at least some embodiments of the present disclosure. With reference initially to FIGS. 1 and 2, an optical module 104 is depicted in accordance with at least some embodiments of the present disclosure. The optical module 104 may correspond to an optical bench or the like with one or multiple mating features 108 designed to receive and secure optical components 204 thereto. As shown in FIG. 2, the optical components 204 may be of varied size and shape and the corresponding mating features 108 on the optical module 104 may be appropriately sized and shaped to receive and secure the optical component(s) 204 thereto.

In accordance with at least some embodiments of the present disclosure, the optical module 104 may correspond to a sheet of material that is substantially transparent to light at a wavelength of interest (e.g., ultraviolet light, visible light, Infrared light, etc.). As used herein, the term "optically transparent" may refer to any structure that is substantially or partially transparent to light having a wavelength of interest or at least to a range of wavelengths. Conversely, "optically non-transparent" or "opaque" may describe structures that are not transparent or capable of facilitating the transmission of light having a wavelength of interest therethrough. As an example, the optical module 104 may correspond to a glass or sapphire substrate that is substantially optically transparent to UV light, visible light, and IR light. Other materials may be included in the optical module 104 without departing from the scope of the present disclosure. For example, the optical module 104 may comprise one or more polymers that are substantially transparent to light at a wavelength of interest.

The optoelectronic component 204 may correspond to a device or collection of devices capable of emitting light at a predetermined wavelength or receiving light at a predetermined wavelength and then converting the received light into an electrical signal. Non-limiting examples of an optoelectronic component 204 include a photodiode, a collection or array of photodiodes, other types of photodetectors (e.g., PIN-type photodiodes), an LED, a collection or array of LEDs, a VCSEL, a collection of VCSELs, or any other type of device capable of converting electricity into light or vice versa.

As shown in FIGS. 3A and 3B, the optical module 104 may have the mating features 108 established in the form of cavities (see FIG. 3A) or with one or more protrusions 308 (see FIG. 3B). In either scenario, the mating feature 108 of the optical module 104 may correspond to an interruption in the top surface of the optical module 104 that is sized to receive the optoelectronic component 204 to the optical module 104. The mating feature 108 or the pieces of the optical module 104 that create the mating feature 108 may be produced using a lithographic process, thereby allowing the dimensions and placement of the mating feature to be precisely controlled with respect to the surface of the optical module 104.

In some embodiments, the optoelectronic component 204 fits within the mating feature 108 and may be fixed therein. The size of the mating feature 108 may be slightly larger (within manufacturing tolerances) than the size of the optoelectronic component 204. The optoelectronic component 204 may be fixed or secured within the mating feature 108 via solder bumps or some other flip-chip bonding process. In other embodiments, the mating feature 108 may be friction fit within the mating feature 108. The combination of the optoelectronic component 204 and the optical module 104 may result in the creation of a first optical assembly 304, which is but one example of an optical assembly.

Figure 4A:
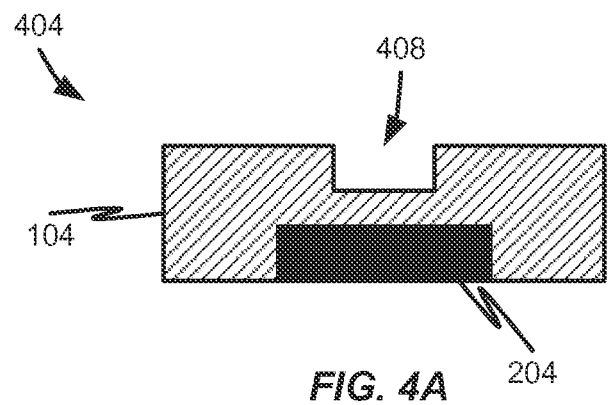
FIG. 4A is a block diagram depicting a first illustrative configuration of an optical assembly in accordance with at least some embodiments of the present disclosure.
Figure 4B:
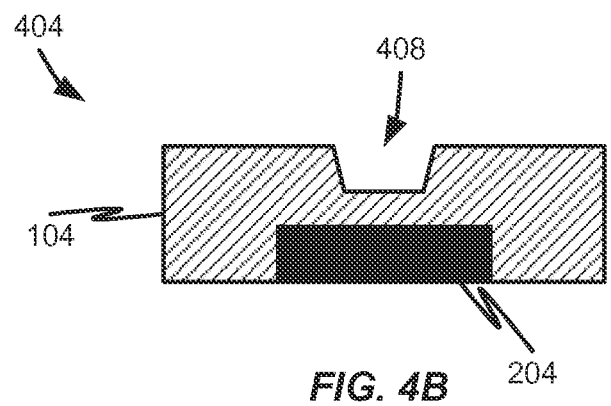
FIG. 4B is a block diagram depicting a second illustrative configuration of an optical assembly in accordance with at least some embodiments of the present disclosure.
Figure 4C:
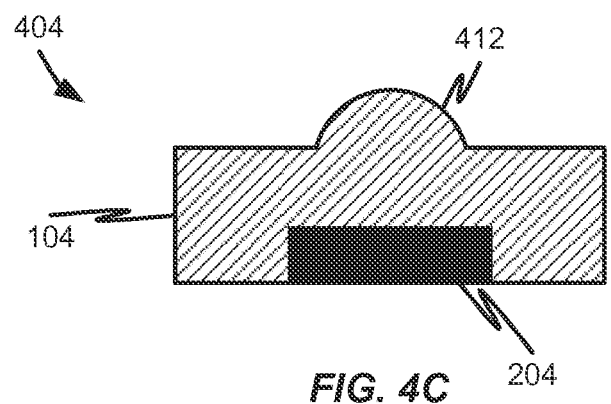
FIG. 4C is a block diagram depicting a third illustrative configuration of an optical assembly in accordance with at least some embodiments of the present disclosure.

With reference now to FIGS. 4A-C, various examples of an optical assembly 404 will be described in accordance with at least some embodiments of the present disclosure. The optical assembly 404 may be similar to optical assembly 304 and have similar features thereto. In addition to having the mating feature 108 described in connection with optical assembly 304, the optical assembly 404 may further include a second feature 408, 412 on a surface that opposes the surface having the mating feature 108. In particular, the optoelectronic component 204 may be positioned within the mating feature 108 on the first surface of the optical module 104. The opposite surface of the optical module 104 may comprise the second feature 408, 412 that is used for aligning an optical fiber with respect to the optoelectronic component 204. In some embodiments, the second feature may correspond to an alignment structure 408 in the form of an indention, recess, cavity, or the like. The position of the alignment structure 408 may be precisely located relative to the mating structure 108 to ensure that a highly accurate alignment is achieved between the optoelectronic component 204 and the optical fiber that is received by the alignment structure 408. As shown in FIGS. 4A and 4B, the alignment structure 408 may have walls that are substantially perpendicular to the main surface of the optical module 104 or the walls may be angled and non-perpendicular to the main surface of the optical module 104. The alignment structure 408 may be formed during lithography while the mating structure 108 is being formed. Because both the alignment structure 408 and mating feature 108 may be formed during the same lithographic process, the alignment (e.g., center of mass of both features) may be highly accurate. The alignment structure 408 may also be used for coupling light into the optoelectronic component 204 (e.g., by use of the funnel-shaped feature).

FIG. 4C shows that the optical module 104 may include a lens 412 or the like that is substantially centered with respect to the center of the mating feature 108. The lens 412 may provide an optical alignment between an optical fiber and the optoelectronic component 204. The lens 412 may be integral to the optical module 104, meaning that the lens 412 is constructed of the same material as the optical module 104 and there is no substantial discontinuity or separation between the two components. In some embodiments, the lens 412 may be formed with a lithographic process similar to the mating feature 108 and/or alignment structure 408. The lens 412 may be configured to direct, focus, and/or converge light traveling between an optical fiber and the optoelectronic component 204. Although the lens 412 is depicted as generally being a refractive lens, it should be appreciated that the lens 412 does not have to be limited to a refractive-type lens. To the contrary, the lens 412 may be diffractive, refractive, and/or reflective without departing from the scope of the present disclosure.

Although not depicted in FIGS. 4A-C, it should also be appreciated that an alignment structure 408 can be used in combination with a lens 412 without departing from the scope of the present disclosure. In particular, an alignment structure 408 may include one or more protrusions that help to mechanically and optically align a fiber with the lens 412 and the lens 412 can then be used to direct, focus, and/or converge light traveling between the optical fiber contained by the alignment structure 408 and the optoelectronic component 204 being held in the mating structure 108.

With reference now to FIG. 5, another example of an optical assembly 504 will be described in accordance with at least some embodiments of the present disclosure. The optical assembly 504 may include aspects of the other optical assemblies discussed and depicted herein. The optical assembly 504 is shown to include the optical module 104 with an optoelectronic component 204 mounted in the mating feature 108 of the optical module 104. The surface of the optical module 104 that opposes the mating feature 108 and optoelectronic component 204 is shown to include a lens 412, such as the lens 412 shown in FIG. 4C. The optical assembly 504 of FIG. 5 depicts additional details of the connecting features between the optoelectronic component 204 and the optical module 104 as well as the elements of the optical module 104 that carry current between the optoelectronic component 204 other external circuit components such as a signal processing unit.

Although the details of the optical assembly 504 will be described in connection with the optical assembly behaving as a receiver of light 508, it should be appreciated that the optical assembly 504 may also be configured to transmit light 508 without departing from the scope of the present disclosure. The discussion of the optical assembly 504 as corresponding to a light-receiving element is simply for ease of discussion and should not be construed as limiting the scope of the present disclosure.

Here, light 508 may be traveling toward the optical assembly 504 as a collimated beam of light or a non-collimated beam of light. The light 508 may correspond to light that has been emitted by an optical fiber and which may or may not have been focused by additional optics, such as a lens or the like.

The light 508 travels to the lens 412 and is focused within a cavity 532 of the optical module 104. The cavity 532 may correspond to a part of the mating feature 108 that is not occupied by the optoelectronic component 204. In other words, a portion of the mating feature 108 may receive and be occupied by the optoelectronic component 204 while another portion of the mating feature 108 may not be occupied by the optoelectronic component 204. The portion of the mating feature 108 not occupied by the optoelectronic component 204 may correspond to a cavity in which focused light 510 travels between the material of the optical module 104 and an active area 528 of the optoelectronic component 204. In some embodiments, the active area 528 of the optoelectronic component 204 is smaller in width that the diameter of the lens 412. The active area 528 may correspond to a surface on a body 524 of the optoelectronic component 204 that is responsible for converting light energy to electrical energy or electrical signals (or vice versa for a transmitter-type optical assembly 504). Alignment between the center of the lens 412 and the center of the optoelectronic component 204 ensures that the light 510 is sufficiently focused on the active area 528. The rest of the body 524 of the optoelectronic component 204 may be optically non-transparent, meaning that the light 510 does not pass through the body 524 of the optoelectronic component 524. The active area 528 may be established on the body 524 using any type of known technique.

In addition to having the active area 528, the optoelectronic component 204 may also comprise one or more solder bumps 520 that physically and electrically connect the optoelectronic component 204 to electrical traces, paths, or vias 512 established on and within the optical module 104. In an embodiment of a receiving optical assembly 504, the light 510 incident on the active area 528 may be converted into electrical signals which are transferred to the electrical traces, paths, or vias 512 through the solder bumps 520. The electrical signals may then be carried through the material of the optical module 104 to a point where they can be transmitted to an external component such as a signal processing unit. Or the like.

Figure 6:
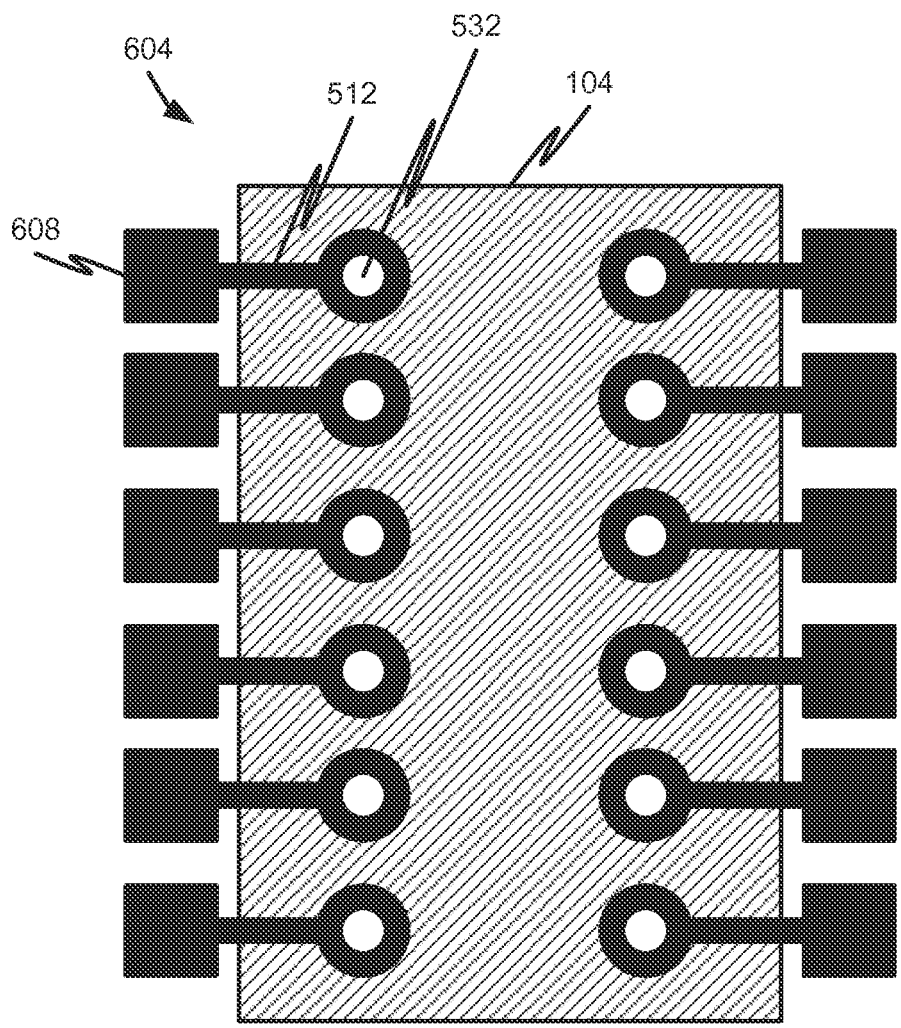
FIG. 6 is a block diagram depicting a further optical assembly in accordance with at least some embodiments of the present disclosure.

With reference now to FIG. 6, additional details of an optical assembly 604, which may be similar to optical assembly 504, will be described in accordance with at least some embodiments of the present disclosure. The optical assembly 604 may include the cavity 532 and electrical traces 512 that travel through the material of the optical module 104. The optical traces 512 may travel both laterally and vertically (e.g., as vias) through the material of the optical module 104. In some embodiments, the electrical traces 512 are established as circular or annular rings that surround the cavity 532 of the mating feature 108. The electrical traces 512 may be directly connected to electrical components in the optoelectronic module 204 via the solder bumps 520 or a similar electrical/mechanical connection structure. The electrical traces 512 may further extend laterally and/or vertically through the material of the optical module 104 until it reaches an exposed surface of the optical module 104. There the electrical traces 512 may be exposed for connection to external circuitry. For instance, the electrical traces 512 may be formed as external leads configured for Surface Mount Technology (SMT) connections, thruhole connection, etc. In some embodiments, the electrical traces 512 may be connected to bond-pads 608 or the like that enable the optical assembly 604 to be connected to external circuitry such as a PCB or signal processing unit.

Figure 7:
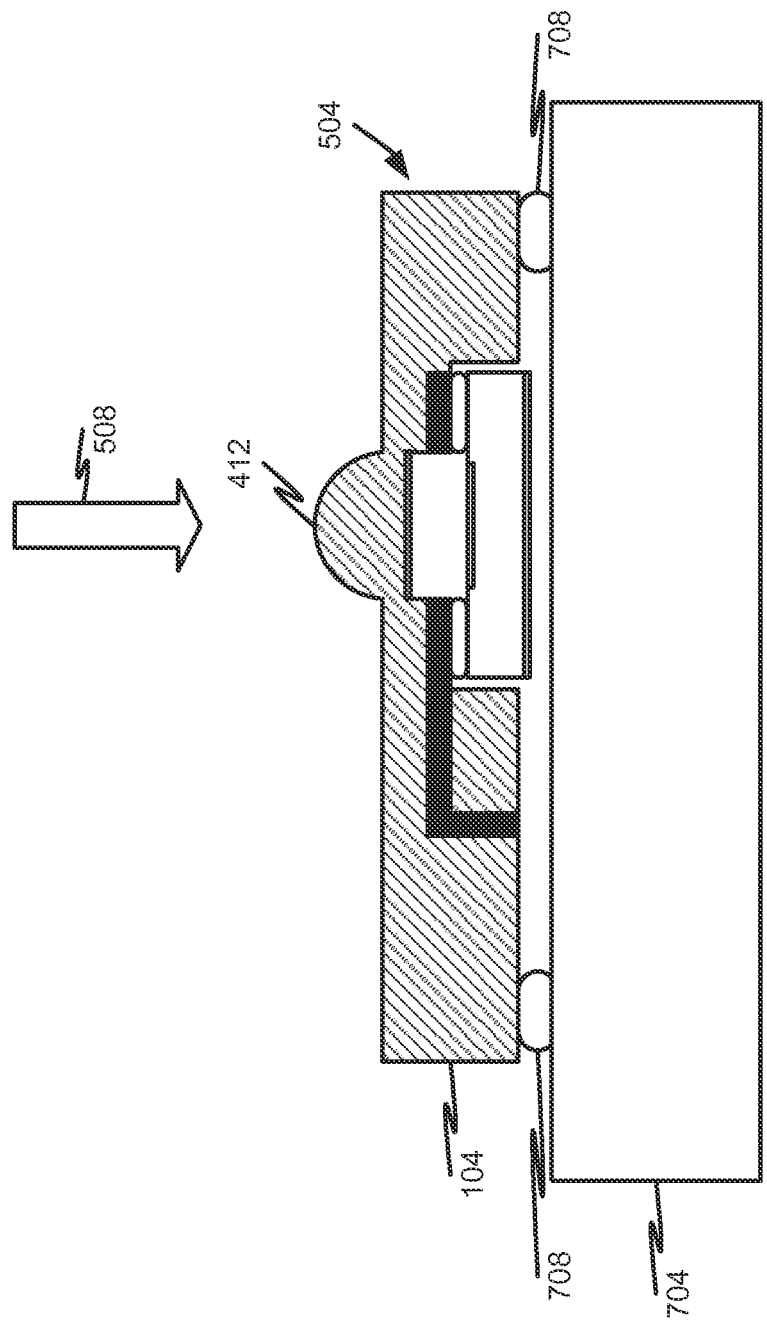
FIG. 7 is a block diagram depicting an optical system in accordance with at least some embodiments of the present disclosure.

With reference now to FIG. 7, additional details of an optical system including the optical assembly 504 (or 604 or any other optical assembly disclosed herein) and a signal processing unit 704 will be described in accordance with at least some embodiments of the present disclosure. The optical system depicted in FIG. 7 may be configured to receive light 708 and or transmit light 708 as part of operating within an optical communication system. As an example, the light 708 may correspond to light traveling to/from optical fiber carrying information via modulated light signals. In some embodiments, the optical system includes the signal processing unit 704 as a component that is capable of processing electrical signals (digital or analog) and communicating those electrical signals to/from the optical assembly 504. The signal processing unit 704 may be connected both electrically and physically to the optical assembly 504 via one or more solder bumps 708. In some embodiments, the bond pads 608 discussed in connection with FIG. 6 can be used to connect the optical assembly 504 to the signal processing unit 704. The optical assembly 504 may be flip-chip bonded to the signal processing unit 704 as an example.

In some embodiments, the signal processing unit 704 may include any element or collection of elements capable of processing analog and/or digital signals. The signal processing unit 704 may include driver circuitry for driving the optical assembly 504 and its components. Examples of a signal processing unit 704 include, without limitation, an Integrated Circuit (IC) chip, a collection of IC chips, an Application Specific IC (ASIC) chip, a collection of ASICs, a PCB, and the like. Although the optical assembly 504 is shown to be connected to the signal processing unit 704 via solder bumps 708, it should be appreciated that the optical assembly 504 may be connected to the signal processing unit 704 via bond-wires, thru-hole connections, and the like.

Figure 8:
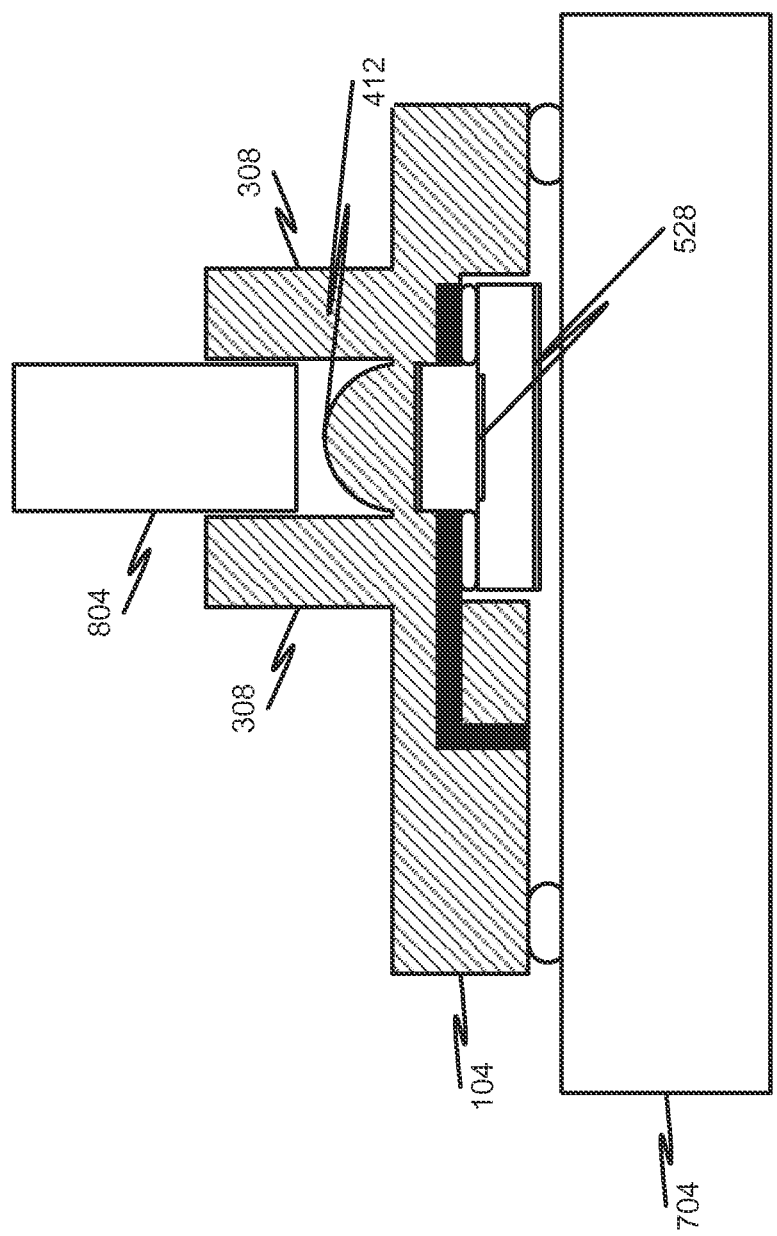
FIG. 8 is a block diagram depicting an optical communication system in accordance with at least some embodiments of the present disclosure.

FIG. 8 shows additional details of an optical communication system incorporating the elements of the optical system depicted in FIG. 7. The optical communication system of FIG. 8 may include a variation of the optical assembly 504 in that the optical module 104 of the optical assembly 504 is shown to include one or more protrusions 308 that surround the lens 412. The protrusions 308 are used to guide and align optical fiber 804 with the lens 412, thereby facilitating an optical alignment between the fiber 804 and optically active area 528 of the optoelectronic component 204. Although the protrusions 308 are shown to receive and align the optical fiber 804 with the lens 512, it should be appreciated that a combination of lens 412 and cavity-type alignment structure 408 can be used. For instance, a cavity-type alignment structure 408 can be established in the optical module 104 and a lens 412 may be formed at a bottom of the cavity-type alignment structure 408. The optical fiber 804 may transmit/receive collimated light and the lens 412 may be used to focus that light onto the optically active area 528.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
an optoelectronic component having a predetermined shape;
an optical module that permits light emitted by the optoelectronic component or travelling to the optoelectronic component to pass therethrough, wherein the optical module comprises a first surface and an opposing second surface, wherein the first surface of the optical module comprises at least one non-planar feature that corresponds to a first mating feature to receive the optoelectronic component and fix a position of the optoelectronic component with respect to the first surface of the optical module via solder bumps or a flip-chip bonding process, wherein the second surface of the optical module comprises at least one non-planar feature that corresponds to a receptacle to receive and align an optical fiber with the optoelectronic component, and wherein the optical module comprises at least one lens that is integral to the optical module and that is positioned in an optical path between the optoelectronic component and the receptacle; and
a signal processing unit that is in electrical communication with the optoelectronic component.

2. The system of claim 1, wherein the optical module comprises an optically transparent material.

3. The system of claim 2, wherein the optical module comprises sapphire and/or glass.

4. The system of claim 1, wherein the first mating feature comprises at least one of a recess in the first surface and a protrusion on the first surface that substantially matches the predetermined shape of the optoelectronic component.

5. The system of claim 4, wherein the receptacle comprises at least one of a recess in the second surface and a protrusion on the second surface.

6. The system of claim 1, wherein the first mating feature comprises a cavity in the first surface that is sized to receive the predetermined shape of the optoelectronic component such that all surfaces of the optoelectronic component are either flush or recessed relative to the first surface of the optical module.

7. The system of claim 6, wherein the optical module comprises one or more electrical traces passing therethrough that are exposed in the cavity such that a connection is established between the optoelectronic component and the one or more electrical traces and wherein the one or more electrical traces are also exposed at the first surface of the optical module such that an electrical connection is established between the signal processing unit and the one or more electrical traces.

8. The system of claim 6, wherein the optoelectronic component comprises at least one of a Light Emitting Diode (LED), a PIN diode, and a Vertical-Cavity Surface-Emitting Laser (VCSEL).

9. The system of claim 8, wherein the at least one lens comprises a refractive lens.

10. The system of claim 6, wherein an anti-reflective coating is provided in the cavity.

11. The system of claim 1, wherein the signal processing unit comprises a Printed Circuit Board (PCB) with at least one Integrated Circuit (IC) chip mounted thereto.

12. The system of claim 11, wherein the optical module and optoelectronic component are flip-chip bonded to the PCB.

13. An optical assembly, comprising:
an optoelectronic component having a predetermined shape;
an optical module that permits light emitted by the optoelectronic component or travelling to the optoelectronic component to pass therethrough, wherein the optical module comprises a first surface and an opposing second surface, wherein the first surface of the optical module comprises a first mating feature to receive the optoelectronic component, wherein an anti-reflective coating is provided in the first mating feature, and wherein the second surface of the optical module comprises a receptacle to receive and align an optical fiber with the optoelectronic component.

14. The optical assembly of claim 13, further comprising:
a light-directing component positioned in an optical path between the optoelectronic component and the receptacle.

15. The optical assembly of claim 14, wherein the light-directing component comprises a lens that is integral to the optical module.

16. The optical assembly of claim 13, wherein the first mating feature comprises a cavity in the first surface that is sized to receive the predetermined shape of the optoelectronic component such that all surfaces of the optoelectronic component are either flush or recessed relative to the first surface of the optical module.

17. The optical assembly of claim 16, wherein the optical module comprises one or more electrical traces passing therethrough that are exposed in the cavity such that a connection is established between the optoelectronic component and the one or more electrical traces and wherein the one or more electrical traces are also exposed at the first surface of the optical module such that an electrical connection is established between a signal processing unit and the one or more electrical traces.

18. The optical assembly of claim 17, wherein light is focused within the cavity.

19. An optical communication system, comprising:
an optical fiber;
an optoelectronic component having a predetermined shape; and
an optical module that permits light traveling between the optical fiber and the optoelectronic component to pass therethrough, wherein the optical module comprises a first surface and an opposing second surface, wherein the first surface of the optical module comprises a first mating feature produced using a lithographic process to receive the optoelectronic component, wherein the second surface of the optical module comprises a receptacle to receive and align the optical fiber with the optoelectronic component, and wherein the optical module comprises at least one lens that is integral to the optical module and that is positioned in an optical path between the optoelectronic component and the receptacle.

20. The optical communication system of claim 19, wherein the optoelectronic component comprises at least one of a Light Emitting Diode (LED), a PIN diode, and a Vertical-Cavity Surface-Emitting Laser (VCSEL).

* * * * *